United States Patent
Geiger et al.

(10) Patent No.: US 11,585,791 B2
(45) Date of Patent: Feb. 21, 2023

(54) TECHNIQUES FOR MONITORING AN ANALYZER INCLUDING MULTIPLE LIQUID CHROMATOGRAPHY STREAMS

(71) Applicant: Roche Diagnostics Operations, Inc., Indianapolis, IN (US)

(72) Inventors: Albert Geiger, Penzberg (DE); Daniel Intelmann, Schaftiach (DE); Ruediger Laubender, Pullach im Isartal (DE); Julian Michely, Munich (DE); Kirill Tarasov, Tutzing (DE)

(73) Assignee: Roche Diagnostics Operations, Inc., Indianapolis, IN (US)

( * ) Notice: Subject to any disclaimer, the term of this patent is extended or adjusted under 35 U.S.C. 154(b) by 0 days.

(21) Appl. No.: 17/113,354

(22) Filed: Dec. 7, 2020

(65) Prior Publication Data

US 2021/0190736 A1    Jun. 24, 2021

(30) Foreign Application Priority Data

Dec. 19, 2019 (EP) .................................... 19218013

(51) Int. Cl.
*G01N 30/72* (2006.01)
*G01N 30/02* (2006.01)
*G01N 30/40* (2006.01)

(52) U.S. Cl.
CPC ... *G01N 30/7233* (2013.01); *G01N 2030/027* (2013.01); *G01N 2030/405* (2013.01)

(58) Field of Classification Search
CPC ......... G01N 30/7233; G01N 2030/027; G01N 2030/405; G01N 30/46; G01N 30/8658; G01N 30/8634; G01N 30/02; G01N 30/72; G01N 30/86; G01N 30/8675
See application file for complete search history.

(56) References Cited

U.S. PATENT DOCUMENTS

| 3,425,369 A | 2/1969 | Kosrow |
| 5,417,853 A | 5/1995 | Mizuno et al. |
| 6,911,151 B1 * | 6/2005 | Muller-Kuhrt ....... G01N 30/466 210/90 |

(Continued)

FOREIGN PATENT DOCUMENTS

| EP | 3425369 A1 | 1/2019 |
| JP | S62-121359 A | 6/1987 |

(Continued)

OTHER PUBLICATIONS

European Search Report dated Jun. 23, 2020, in Application No. 19218013.1, 2 pp.

*Primary Examiner* — David J Bolduc
(74) *Attorney, Agent, or Firm* — Roche Diagnostics Operations, Inc.

(57) ABSTRACT

A method for monitoring an analyzer including a liquid chromatography device (LC) having at least two liquid chromatography (LC) streams, the method including continuously monitoring one or more parameters in measurement data of samples in each of the at least two LC streams, the one or more parameters being independent of an analyte concentration of the respective sample, determining if the one or more monitored parameters show an expected behavior and triggering a response upon detection that the one or more monitored parameters deviate from the expected behavior.

17 Claims, 4 Drawing Sheets

(56) References Cited

U.S. PATENT DOCUMENTS

| | | | | |
|---|---|---|---|---|
| 7,018,540 | B2* | 3/2006 | Brann | G01N 30/88 |
| | | | | 210/659 |
| 9,063,158 | B2* | 6/2015 | Steel | G01N 30/74 |
| 10,830,740 | B2* | 11/2020 | Gebauer | G01N 30/467 |
| 2009/0145851 | A1* | 6/2009 | Witt | G01N 30/32 |
| | | | | 210/741 |
| 2013/0303409 | A1* | 11/2013 | Kapps | G01N 30/24 |
| | | | | 506/39 |
| 2014/0305195 | A1 | 10/2014 | Blaschyk et al. | |
| 2017/0241992 | A1* | 8/2017 | Muller-Spath | G01N 30/8658 |
| 2018/0128797 | A1* | 5/2018 | Satpute | G01N 30/8651 |
| 2018/0292368 | A1* | 10/2018 | Franz | B01D 15/1885 |
| 2020/0124576 | A1* | 4/2020 | Kobold | G01N 33/487 |
| 2021/0313159 | A1* | 10/2021 | Hashimoto | H01J 49/0036 |

FOREIGN PATENT DOCUMENTS

| | | |
|---|---|---|
| JP | 2015-052533 A | 3/2015 |
| WO | 2000/031528 A1 | 6/2000 |
| WO | 2011/123039 A1 | 10/2011 |
| WO | 2011/123040 A1 | 10/2011 |
| WO | 2012/043102 A1 | 4/2012 |
| WO | 2017/103180 A1 | 6/2017 |

* cited by examiner

TECHNIQUES FOR MONITORING AN ANALYZER INCLUDING MULTIPLE LIQUID CHROMATOGRAPHY STREAMS

CROSS-REFERENCE TO RELATED APPLICATIONS

This application claims priority to European Patent Application No. 19218013.1, filed 19 Dec. 2019, the disclosure of which is hereby incorporated by reference in its entirety.

TECHNICAL FIELD

This disclosure relates to methods and apparatus for liquid chromatography. In particular, this disclosure relates to methods and systems for monitoring an analyzer with a liquid chromatography device including multiple LC streams.

BACKGROUND

There is growing interest for the implementation of LC devices, often coupled to mass spectrometers (MS) in the clinical laboratory and also in other laboratory settings. The number of published methods, especially for small molecules in therapeutic drug monitoring or drug of abuse testing is increasing.

In particular, there is growing interest in operating analyzers in a random-access mode, i.e., analyzers in which a plurality (potentially a relatively large number) of different assays can be processed in any given measurement period (e.g., during a period of one (work) day or a fraction of a day). This can dramatically increase the number of quality control runs that have to be carried out as, e.g., quality control runs at multiple concentration levels (e.g., two or three concentration levels) have to be carried out in regular intervals for each assay. For instance, typical regulatory standards can require one or more quality control runs per day. This issue of a large number of required quality control runs is further aggravated in systems including multiple LC streams which can be multiplexed to connect to, e.g., a single MS. For these systems, each LC stream might be seen as a separate instrument to be subjected to quality control. Thus, in a system having three or more LC streams connected to an MS, the quality control measurements at each required or desired concentration level for each assay have to be performed three or more times respectively per quality control period.

As a result, an ever longer amount of analyzer time might have to be allocated for quality control runs. Therefore, techniques for reducing the quality control effort while still ensuring that the instrument is properly monitored, particularly for analyzers operating in a random-access mode and having multiple LC streams are desirable.

SUMMARY

It is against the above background that the embodiments of the present disclosure provide certain unobvious advantages and advancements over the prior art. In particular, the inventors have recognized a need for improvements in techniques for monitoring an analyzer including multiple liquid chromatography streams.

In accordance with one embodiment of the present disclosure, a method for monitoring an analyzer including a liquid chromatography (LC) device having at least two LC streams is provided, the method comprising continuously monitoring one or more parameters in measurement data of samples in each of the at least two LC streams. The one or more parameters are independent of an analyte concentration of an analyte of interest of the respective sample. The method further comprises determining if the one or more monitored parameters show an expected behavior and triggering a response upon detection that the one or more monitored parameters deviate from the expected behavior.

In accordance with another embodiment of the present disclosure, an analyzer combining a liquid chromatography device (LC) and a mass spectrometer (MS) is provided, the analyzer including at least two liquid chromatography (LC) streams connected to a single mass spectrometer (MS), the analyzer being configured to carry out the steps of the method of the first embodiment of the present disclosure.

In accordance with yet another embodiment of the present disclosure, a computer readable medium including instructions stored thereon is provided, which when executed by a processor of an analyzer prompt the analyzer to carry out the steps of the method of the first embodiment of the present disclosure.

Although the embodiments of the present disclosure are not limited to specific advantages or functionality, it is noted that the techniques of the present disclosure have certain advantageous technical effects. Firstly, the technique of the embodiments of the present disclosure can reduce the quality control effort required to control an analyzer having at least two liquid chromatography (LC) streams. According to the present disclosure, parameters being independent of an analyte concentration of an analyte of interest of the respective sample are continuously monitored for each LC stream. It is then (also continuously) determined if the one or more monitored parameters show an expected behavior or deviate from an expected behavior. In some examples, the monitored parameters can be used to compare the development of the parameters in two different LC streams. In other examples the monitored parameters are compared to monitoring results of a single stream longitudinally (e.g., a comparison to a monitoring result directly after a quality control run). Regardless of the specific case, the comparison result can be indicative of a need of the analyzer for performing a quality control run, or a different measure. On the other hand, if the LC streams' monitored parameters behave as expected, no quality control or other measure might be required. In this manner, a time between two subsequent quality control runs can be extended as the quality control status can be continuously monitored.

For instance, it can be sufficient to carry out quality control runs (or a subset of the required quality control runs) at a first LC stream at a first day but not for a second LC stream, as the monitoring can allow for monitoring the quality control status of the second stream indirectly.

Secondly, the monitoring can happen during production mode of the analyzer, as parameters independent of a usually unknown analyte concentration of an analyte of interest of a sample (e.g., a patient sample) can be used as basis of the monitoring operations. In that manner, the analyzer can be more productive as less time has to be reserved for quality control operations.

Thirdly, the techniques of the present disclosure can allow predicting (and thus scheduling) a required quality control operation as a preventive measure. This can give the operators of the analyzers sufficient heads-up time to efficiently arrange that the respective quality control operation is carried out in a timely manner. For instance, a quality control run can be scheduled during a time when a work-load of the analyzer is low.

These and other features and advantages of the embodiments of the present disclosure will be more fully understood from the following detailed description taken together with the accompanying claims. It is noted that the scope of the claims is defined by the recitations herein and not by the specific discussion of features and advantages set forth in the present description.

Figure 1:
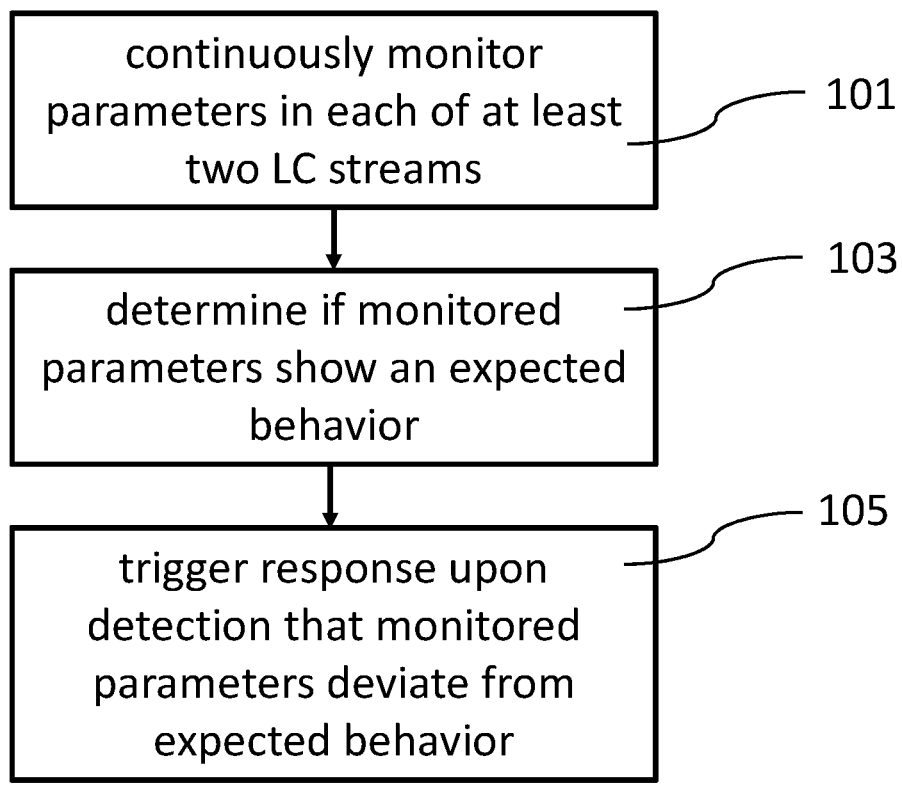
FIG. 1 is a flow diagram illustrating the monitoring techniques of an embodiment of the present disclosure.

Skilled artisans appreciate that elements in the figures are illustrated for simplicity and clarity and have not necessarily been drawn to scale. For example, the dimensions of some of the elements in the figures may be exaggerated relative to other elements to help improve understanding of the embodiments of the present disclosure

DETAILED DESCRIPTION

The term "continuously" according to the present disclosure describes an ongoing operation that can be intermittent or non-intermittent. Continuously monitoring can involve taking action at regular time intervals or upon occurrence of certain trigger events.

The expression "concentration" in the present disclosure includes a concentration of (substantially) zero of a substance or analyte. In other words, a detection of a concentration of a substance or analyte includes detecting a presence or absence of the substance or analyte.

An "analyzer" according to the present disclosure is a—usually automated—laboratory apparatus dedicated to the analysis of samples (e.g., samples for in vitro diagnostics). For example, an analyzer can be a clinical diagnostics system for performing in-vitro diagnostics.

The analyzers of the present disclosure can have different configurations according to the need and/or according to the desired laboratory workflow. Additional configurations may be obtained by coupling a plurality of apparatuses and/or modules together. A "module" is a work cell, typically smaller in size than the entire analyzer, which has a dedicated function. This function can be analytical but can be also pre-analytical or post-analytical or it can be an auxiliary function to any of the pre-analytical function, analytical function or post-analytical function. In particular, a module can be configured to cooperate with one or more other modules for carrying out dedicated tasks of a sample processing workflow, e.g., by performing one or more pre-analytical and/or analytical and/or post-analytical steps.

In particular, the analyzers can comprise one or more analytical apparatuses, designed to execute respective workflows that are optimized for certain types of analysis.

The analyzers of the present disclosure include a liquid chromatography device (LC) having at least two liquid chromatography (LC) streams. In some examples, the LC device is coupled to a mass spectrometer (MS). The analyzers include at least two liquid chromatography (LC) streams connected to a single mass spectrometer (MS). In addition, the analyzer can include analytical apparatuses for one or more of clinical chemistry, immunochemistry, coagulation, hematology, etc.

Thus, the analyzer may comprise one analytical apparatus or a combination of any of such analytical apparatuses with respective workflows, where pre-analytical and/or post analytical modules may be coupled to individual analytical apparatuses or be shared by a plurality of analytical apparatuses. In alternative pre-analytical and/or post-analytical functions may be performed by units integrated in an analytical apparatus. The analyzer can comprise functional units such as liquid handling units for pipetting and/or pumping and/or mixing of samples and/or reagents and/or system fluids, and also functional units for sorting, storing, transporting, identifying, separating, detecting.

The term "sample" refers to a biological material suspected of containing one or more analytes of interest and whose detection, qualitative and/or quantitative, may be associated to a particular condition (e.g., a clinical condition).

The sample can be derived from any biological source, such as a physiological fluid, including, blood, saliva, ocular lens fluid, cerebral spinal fluid, sweat, urine, milk, ascites fluid, mucous, synovial fluid, peritoneal fluid, amniotic fluid, tissue, cells or the like. The sample can be pretreated prior to use, such as preparing plasma from blood, diluting viscous fluids, lysis or the like; methods of treatment can involve filtration, centrifugation, distillation, concentration, inactivation of interfering components, and the addition of reagents. A sample may be used directly as obtained from the source in some cases or following a pretreatment and/or sample preparation workflow to modify the character of the sample, e.g., after adding an internal standard, after being diluted with another solution or after having being mixed with reagents, e.g., to enable carrying out one or more in vitro diagnostic tests, or for enriching (extracting/separating/concentrating) analytes of interest and/or for removing matrix components potentially interfering with the detection of the analyte(s) of interest.

The term "sample" is typically used to indicate a sample before sample preparation whereas the term "prepared sample" is used to refer to samples after sample preparation. In non-specified cases the term "sample" may generally indicate either a sample before sample preparation or a sample after sample preparation or both. Examples of analytes of interest are vitamin D, drugs of abuse, therapeutic drugs, hormones, and metabolites in general. The list is however not exhaustive.

In particular, the analyzer can comprise a sample preparation station for the automated preparation of samples. A "sample preparation station" is a pre-analytical module coupled to one or more analytical apparatuses or a unit in an analytical apparatus designed to execute a series of sample processing steps aimed at removing or at least reducing interfering matrix components in a sample and/or enriching analytes of interest in a sample. Such processing steps may include any one or more of the following processing operations carried out on a sample or a plurality of samples, sequentially, in parallel or in a staggered manner pipetting (aspirating and/or dispensing) fluids, pumping fluids, mixing with reagents, incubating at a certain temperature, heating or cooling, centrifuging, separating, filtering, sieving, drying, washing, resuspending, aliquoting, transferring, storing . . . ).

A "reagent" is a substance used for treatment of a sample in order, e.g., to prepare a sample for analysis, to enable a reaction to occur, or to enable detection of a physical parameter of the sample or analyte contained in the sample. In particular, a reagent can be a substance that is or comprises a reactant, typically a compound or agent capable, e.g., of binding to or chemically transforming one or more analytes present in a sample or an unwanted matrix component of the sample. Examples of reactants are enzymes, enzyme substrates, conjugated dyes, protein-binding molecules, ligands, nucleic acid binding molecules, antibodies, chelating agents, promoters, inhibitors, epitopes, antigens, and the like. However, the term reagent is used to include any fluid that can be added to a sample including a dilution liquid, including water or other solvent or a buffer solution, or a substance that is used for disruption of specific or nonspecific binding of an analyte to a protein, binding proteins or surfaces.

Sample may be provided for example in sample containers such as sample tubes, including primary tubes and secondary tubes, or multi-well plates, or any other sample carrying support. Reagents may be arranged for example in the form of containers or cassettes containing individual reagents or group of reagents and placed in appropriate receptacles or positions within a storage compartment or conveyor. Other types of reagents or system fluids may be provided in bulk containers or via a line supply.

An "LC stream" is a fluidic line comprising at least one capillary tubing and/or LC column comprising a stationary phase selected according to the type of sample(s) and analytes and through which a mobile phase is pumped in order to trap and/or separate and elute and/or transfer analytes of interest under selected conditions, e.g., according to their polarity or log P value, size or affinity, as generally known. The at least one LC column in the at least one LC stream may be exchangeable. In particular, a liquid chromatography device may comprise more LC columns than LC streams, where a plurality of LC columns may be interchangeably coupled to the same LC stream. A capillary tubing may bypass an LC column or may allow adjustment of dead volumes to fine-tune elution time windows.

Unless specified differently in the respective context, the terms "about" in connection with values for parameters means to include a deviation of +/−10% from the specified value in the present disclosure.

In order that the embodiments of the present disclosure may be more readily understood, reference is made to the following examples, which are intended to illustrate the disclosure, but not limit the scope thereof.

First, an overview of the techniques of the present disclosure will be given in connection with FIG. 1. Subsequently, particular examples of the monitoring techniques of the present disclosure will be discussed in connection with FIG. 2 and FIG. 3. Last, an example analyzer setup which can implement the monitoring techniques of the present disclosure will be discussed in connection with FIG. 4.

As shown in FIG. 1, the method of the present disclosure includes continuously monitoring 101 one or more parameters in measurement data of samples in each of at least two LC streams, optionally connected to a MS device, of an analyzer. The one or more parameters are independent of an analyte concentration of analyte of interest of the respective sample.

The analyte can be the analyte of interest for a particular assay carried out by the analyzer (or for a plurality of analytes of interest of multiple assays). For example, if the analyte of interest is testosterone or vitamin D, many measurement parameters of the sample will be dependent on the concentration (e.g., presence) of testosterone or vitamin D However, other measurement parameters are independent of the concentration (e.g., presence) of testosterone or vitamin D. One or more of these or other parameters are monitored when using the techniques of the present disclosure. Further details regarding which parameters can be independent of an analyte concentration of analyte of interest of the respective sample will be given below.

In some examples, the continuously monitoring happens on samples with unknown composition. In other words, the sample is other than a quality control sample having a controlled or known composition (or another sample having a controlled or known composition). Rather, the concentration of one or more constituents of the sample is unknown, or the presence of at least one substance in the sample is unknown.

For instance, the samples with unknown composition can include patient samples to be analyzed by the analyzer. In other examples, the samples of unknown composition can include other samples than patient samples to be analyzed by the analyzers (e.g., samples to be analyzed in other settings than clinical or point-of-care laboratory settings). Naturally, there can be different "degrees of uncertainty" regarding a composition of the samples with unknown composition. For example, the concentrations of each of a plurality of constituents (which might be detectable by using different assays) of the sample can be unknown. In such situations, the one or more parameters can be independent of each of the unknown analyte concentrations.

In some examples, the continuously monitoring happens on a majority of samples, optionally each sample processed by the analyzer (e.g., more than 90% of the samples analyzed by the analyzer). For instance, one or more parameters can be monitored in each patient sample, or a majority of patient samples analyzed in a clinical analyzer (e.g., more than 90% of the patient samples analyzed by the analyzer).

The techniques of the present disclosure can make use of the insight that even when measuring an unknown sample (e.g., a patient sample in which composition of the sample including concentrations of different substances is unknown) there are certain parameters which are not influenced by the changes in composition. These parameters can be used to monitor continuously the performance of LC streams as monitoring results of different unknown samples can be compared. In this manner, patient samples or other samples to be analyzed can be used as monitoring samples. This allows monitoring of the LC streams without impact (or with little impact) on the productivity of the analyzer as the samples can be processed to determine their composition (e.g., a concentration of an analyte of interest) while at the same time carrying out the monitoring operation. As a consequence, a number of quality control runs (or other dedicated checks which detract from the productivity of the analyzer) can be reduced in some examples.

The method further comprises determining 103 if the one or more monitored parameters show an expected behavior. Determining if a parameter shows an expected behavior can include different operations according to the present disclosure. In general, the expected behavior can be defined with respect to earlier monitoring results or other measurement results in the same LC stream or a different LC stream of the analyzer. In addition, the expected behavior can be selected so that when the monitored parameters show the expected behavior, a normal operation of the analyzer can be assumed (which might include a stationary behavior or a particular expected dynamic behavior such as a drift). In other words, a deviation from the expected behavior can be indicative that a particular LC stream no longer operates within a predetermined specification, or that it will no longer work within a predetermined specification in the foreseeable future.

In some examples, the expected behavior includes that the one or more parameters fall within a target range or target ranges for the respective monitored one or more parameters or a target range for a composite value calculated from two or more monitored parameters.

For instance, a target range can be defined for a parameter based on an earlier monitoring result or other measurement result (e.g., +/−10% or another value deviation from the earlier monitoring result or other measurement result). In some examples, a target range can be fixed during operation of the analyzer. In other examples, the target range can be dynamically updated during operation of the analyzer. In addition or alternatively, deviating from the expected behavior can include deviating by more than a threshold distance from one or more previous values of the one or more monitored parameters.

In addition or alternatively, the expected behavior can be defined based on one or more measurements taken from previous samples processed in the analyzer. Again, as discussed above, a target range can be defined based on the measurements taken from previous samples processed in the analyzer.

In still other examples, the expected behavior is a particular correlation (i.e., a correlation over time) between the one or more monitored parameters and additional monitored parameters of the analyzer. For example, monitored parameters of different LC streams can be correlated. In still other examples, parameters of the same LC stream can be correlated. Any known correlation technique can be used to correlate the different parameters.

In still further examples, the expected behavior is determined based on a trend or a longitudinal analysis in the one or more monitored parameters.

For instance, a linear or non-linear regression technique can be used to determine an expected behavior of the monitored parameters (e.g., a rolling linear or non-linear regression technique can be used to determine an expected behavior of the monitored parameters). In other examples, the expected behavior can be determined based on other longitudinal profiling techniques which can include a single monitored parameter, or a multitude of monitored parameters (i.e., taking into account multiple parameters at multiple points in time). In some examples, a trend or a longitudinal analysis can include using quality control charts, statistical process control techniques, time series analysis techniques (e.g., autoregressive integrated moving average [ARIMA] modelling or other times series analysis techniques), mixed effects model for longitudinal analyses, deep learning techniques and neural nets, or a combination of two or more of these techniques.

Returning to FIG. 1, the method includes triggering 105 a response upon detection that the one or more monitored parameters deviate from the expected behavior.

In general, the (triggered) response can include any reaction that uses the information gained from the monitoring process.

In some examples, a response includes scheduling or triggering a quality control run on the respective LC stream whose one or more monitored parameters deviate from the expected behavior. For instance, the response can include scheduling or triggering a quality control run in a second LC stream of the at least two LC streams based on the determining that the one or more monitored parameters in the second LC stream deviate from the expected behavior determined based on the monitored one or more parameters in a first LC stream.

In some examples, the monitoring process according to the present disclosure can replace quality control runs, or reduce a frequency of quality control runs in LC streams of the analyzer. In general, similar insights into the performance of an LC stream as when performing a quality control run can be gleaned from the monitored parameters according to the present disclosure. Therefore, the response can include scheduling or triggering a quality control run on the respective LC stream.

In addition or alternatively, the response can include scheduling or triggering a maintenance operation on the respective LC stream (e.g., checking and/or fixing a particular component of the analyzer). For instance, the response can include scheduling or triggering a maintenance operation of a second LC stream of the at least two LC streams based on the determining that the one or more monitored parameters in the second LC stream deviate from the expected behavior determined based on the monitored one or more parameters in a first LC stream.

In other examples, the response can include providing a warning or an error message (e.g., on a graphical user interface to a local or remote operator of the analyzer). In still other examples, the response can include stopping the operation of the respective LC stream or the analyzer. Two or more of the above discussed operations can be triggered in combination in some examples.

The responses above can be triggered automatically in some examples (for instance, the analyzer can automatically schedule and/or carry out a quality control run on a particular LC stream). In other examples, a triggered response can be a first step or first series of steps (e.g., a warning or error message) which are triggered automatically and then require subsequent attention of, e.g., an operator or service personnel to complete the response (e.g., a maintenance operation).

After having discussed the core elements of the technique of the present disclosure in the preceding sections, example monitoring parameters that can be used in the techniques of the present disclosure will be discussed subsequently.

Example Technique Including Comparing Different LC Streams

According to the present disclosure, the one or more monitored parameters of different LC streams of the two or more LC streams can be considered in combination to determine if the one or more monitored in each stream show the expected behavior.

In some examples, the expected behavior for a second LC stream of the at least two LC streams is determined based on the monitored one or more parameters in a first LC stream of the at least two LC streams.

In addition or alternatively, a deviation of the one or more monitored parameters in a second LC stream of the at least two LC streams is determined based on evaluating the one or more monitored parameters in at least the second LC stream and a first LC stream of the at least two LC streams.

In some examples, a target range or target ranges are determined based on one or more measurements in a first LC stream different from a second LC stream whose monitored one or more parameters are used in the determining step. For instance, the first LC stream is a LC stream which has undergone a quality control run more recently than the second LC stream. In other examples, the first LC stream is a LC stream in which one or more components, (e.g., an LC column), have been replaced or have undergone a maintenance operation more recently than the respective one or more components of the second LC stream.

Figure 2:
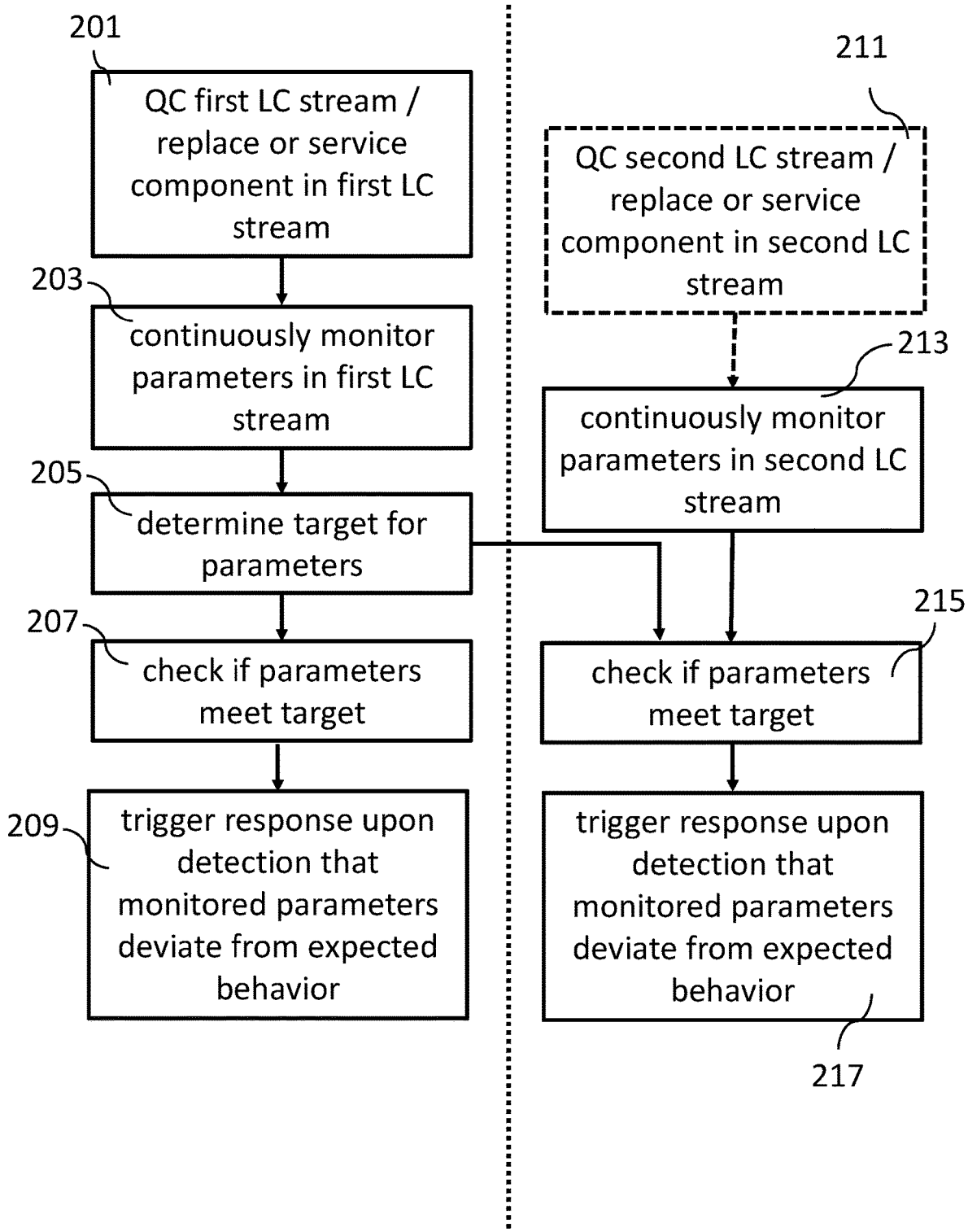
FIG. 2 is a flow diagram illustrating an example monitoring technique including two LC streams according to an embodiment of the present disclosure.

FIG. 2 is a flow diagram illustrating an example monitoring technique including two LC streams according to the present disclosure.

The method includes continuously monitoring one or more parameters in a first LC stream 203 and a second LC stream 213.

In a further step, a target range (or multiple target ranges) is determined 205 for one or more parameters based on one or more measurements in the first LC stream different from the second LC stream.

In some examples, the first LC stream is a LC stream which has undergone a quality control run more recently than the second LC stream. For example, in FIG. 2 a quality control run in the first LC stream 201 has happened more recently than a quality control run in the second LC stream 211. In other examples, a maintenance or replacement operation in the first LC stream 201 has happened more recently than a quality control run in the second LC stream 211. For instance, a first LC column in the first LC stream can have been replaced or undergone a maintenance operation more recently than a second LC column in the second LC stream (the first LC column is "younger" than the second LC column). In other examples, other components of the first LC stream can have been replaced or undergone a maintenance operation more recently than a respective component in the second LC stream (e.g., one or more of a pump, a valve or a capillary).

The analyzer checks if the parameter meets the target range in the first LC stream 207 and the second LC stream 215. In particular, as depicted in FIG. 2, the check in the second LC stream can happen using the target range determined based on the monitored parameters in the first LC stream. The rationale for this operation can be that the first LC stream has undergone a quality control run (or maintenance or replacement operation) more recently than the second LC stream, which means that the parameters determined for the first LC stream are more likely indicative of a properly operating system. Therefore, the method can include assuming that the second LC stream is operating properly when the monitored one or more parameters do not deviate from the target range.

In some examples, the target range can be directly used in both LC streams. However, in other examples the target range can be modified before using it for the second stream. For instance, it might be the case that the second LC stream has a different configuration (e.g., a different employed LC column or other structural differences) so that it cannot be expected that the same target range can be used for both LC streams. This difference can be taken into account by suitably modifying the values of the monitored parameters to take into account the difference. For instance, a scaling factor or another modification factor can be employed before the target is used in the second LC stream. In other examples, normalized or relative target values can be used to make the targets independent (at least partially) from the LC stream.

In the example of FIG. 2 a target is determined in one LC stream and then used in another LC stream for monitoring purposes. However, the techniques of the present disclosure can allow for monitoring one LC stream based on monitored parameters of another LC stream also in different ways.

For instance, the determining if the one or more monitored parameters show an expected behavior can include comparing monitored one or more parameters in different ones of the two or more LC streams (e.g., in the first and second LC streams of FIG. 2). In this situation, one can still think of one LC stream setting a target range for the other LC stream. For example, it can be determined if a parameter of one LC stream deviates (e.g., by more than a threshold value) from a respective parameter in the other stream. The comparing step can also be carried out in other ways, e.g., by evaluating a particular comparison metric. In addition, multiple parameters can be compared individually or in combination.

In still other examples, the method can include correlating the monitored one or more parameters in different ones of the two or more LC streams (e.g., in the first and second LC streams of FIG. 2). In this case, a correlation being below a certain threshold might indicate an issue in one or the other stream. The correlation step can also include correlating multiple parameters.

It has been discussed above that an LC stream which has undergone a quality control run more recently than another LC stream is used to determine a target (and thus as a kind of reference). However, in other examples two LC streams can be compared, correlated or monitored in combination in any other form without treating one of the LC streams in a preferred manner. In these examples, the monitoring technique can yield the result that both LC streams no longer behave in synchrony (which can indicate an issue in any of the LC streams). For instance, the comparison and correlation techniques described above can yield the result that the two LC streams no longer behave as expected, i.e., in the same manner. This can mean that there is an issue in one of the LC streams, or both of them. Therefore, responses for either of the LC streams, or both LC streams can be triggered in some examples. For example, the analyzer can trigger quality control runs for both LC streams or further checks to determine which LC stream might have an issue.

In some examples, the techniques of the present disclosure can be used to monitor the two or more LC streams on a quality control concentration level basis (e.g., for two concentration levels or three concentration levels, or for more than three concentration level per analyte of interest or assay). In this situation, a first LC stream can be an LC stream which has more recently undergone a quality control run for a particular concentration level (e.g., for a particular analyte of interest or assay). In other examples, the first stream can be selected in different ways (e.g., a stream which has undergone a maintenance or replacement operation more recently). One or more parameters according to the present disclosure can be monitored in the first LC stream and a second LC stream. It can be monitored if the one or more parameters in the second stream deviate from the expected behavior determined based on the monitored one or more parameters in the first LC stream (e.g., by comparing the monitored parameters in the second stream to the corresponding monitored parameters in the first steam). The same procedure can be carried out for further quality control concentration levels. In some examples, different LC streams of the two or more LC streams can be used to determine a deviation in a further LC stream of the two or more streams for different quality control concentration levels.

For example, for a first quality control concentration level, one or more monitored parameters in a first LC stream can be used to determine if the corresponding one or more monitored parameters in a second LC stream show an expected behavior as discussed in the present disclosure. In addition, for a second quality control concentration level, one or more monitored parameters in a third LC stream can be used to determine if the corresponding one or more monitored parameters in the second LC stream show an expected behavior as discussed in the present disclosure. This procedure can be expanded for additional quality control levels.

In addition or alternatively, the techniques of the present disclosure can be performed on a per assay or per analyte of interest basis (e.g., for multiple or all assays or analytes of interest of a particular analyzer).

In this situation, a first LC stream can be an LC stream which has more recently undergone a quality control run for a particular analyte of interest or assay. In other examples, the first stream can be selected in different ways (e.g., a stream which has undergone a maintenance operation more recently). One or more parameters according to the present disclosure can be monitored in the first LC stream and a second LC stream. It can be monitored if the one or more parameters in the second stream deviate from the expected behavior determined based on the monitored one or more parameters in the first LC stream (e.g., by comparing the monitored parameters in the second stream to the corresponding monitored parameters in the first steam). The same procedure can be carried out for further assays or analytes of interest. In some examples, different LC streams of the two or more LC streams can be used to determine a deviation in a further LC stream of the two or more streams for different assays or analytes of interest.

For example, for a first assay or analyte of interest, one or more monitored parameters in a first LC stream can be used to determine if the corresponding one or more monitored parameters in a second LC stream show an expected behavior as discussed in the present disclosure. In addition, for a second assay or analyte of interest, one or more monitored parameters in a third LC stream can be used to determine if the corresponding one or more monitored parameters in the second LC stream show an expected behavior as discussed in the present disclosure. This procedure can be expanded for additional assays or analytes of interest.

In the preceding sections techniques for using monitored parameters in two LC streams have been (predominantly) described. These techniques can be extended to more than two LC streams. For instance, a target range set based on monitored parameters for a first LC stream can be used to check the monitored parameters for a second and a third LC stream. In another example, three or more LC streams' monitored parameters can be compared or correlated. For example, a pair-wise correlation of different pairs of LC columns can be calculated as part of the determination step.

Returning to FIG. 2, depending on the outcome of the checking steps, responses can be triggered for the first and/or second LC streams, as described above.

Regardless of the specific technique of using monitored parameters in two LC streams, it can be possible to reduce the number of quality control runs for an analyzer having multiple LC streams by using the techniques described herein.

Example Monitoring Parameters

There are multiple parameters which can be independent of an analyte concentration of the analyte of interest of the respective sample according to the present disclosure. Several example parameters which can be used in the techniques of the present disclosure will be discussed subsequently.

In general, the one or more monitored parameters are determined based on one or more of a peak width parameter, a peak shape parameter (e.g., an asymmetry or tailing of an MS peak), or a retention time.

In addition or alternatively, the one or more monitored parameters are determined based on one or more of a peak height parameter or a peak area parameter of a measurement peak.

In still other examples, the one or more monitored parameters are determined based on at least one of a peak start time parameter or a peak end time parameter.

For example, the height parameter can be a peak height of a peak, or a signal intensity at a peak.

For example, the peak width parameter can be a peak width of a peak at a predetermined fraction of the peak height (e.g., at 3%-7% peak height, for instance at 5% peak height, or at 8% to 12% peak height, for instance 10% peak height, or at 45%-55% peak height, for instance 50% peak height, or at 70% to 80% peak height, for instance at 75% peak height).

In other examples, a peak shape parameter can be a parameter indicating an asymmetry or tailing of a peak, e.g., a skew or excess parameter of the peak.

In some examples, the peak start parameter can be a retention time of a particular feature at a rising edge of a peak. For instance, the peak start parameter can be a retention time at a signal level of between 0% and 10% (e.g., 5%) of a peak height at a rising edge of the peak.

In some examples, the peak end parameter can be a retention time of a particular feature at a falling edge of a peak. For instance, the peak end parameter can be a retention time at a signal level of between 0% and 10% (e.g., 5%) of a peak height at a falling edge of the peak.

The retention time parameter can be determined based on determining a retention time (e.g., of a particular feature in the measurement data) with a predetermined accuracy (e.g., to two or three decimal places).

In still other examples, the one or more monitored parameters are determined based on one or more of a measurement background parameter and a measurement noise parameter. For instance, the parameter can be a signal like a total noise parameter, a signal to noise parameter, a background magnitude parameter, or a background variation parameter. In still other examples, the parameter can be indicative of a spray noise of an ionization source of the analyzer.

In still other examples, the one or more monitored parameters are determined based on a baseline parameter. For example, the baseline parameter can be a slope of a baseline or determined based on measurement values below or above a baseline.

In still other examples, the one or more monitored parameters can include residuals of a peak integration process of a peak.

In still other examples, the one or more monitored parameters can include a time resolved measurement signal (e.g., a time series of measurement points).

Two or more of the parameters above can be processed separately to determine if the monitored parameters show the expected behavior (e.g., a peak width parameter and a retention time parameter can be processed separately).

In the preceding sections, different parameters which can be independent of an analyte concentration of the respective sample that can be used as monitoring parameters according to the present disclosure have been discussed. These parameters can be used directly in the techniques of the present disclosure. In other examples, two or more of the above described parameters can be combined into a combined parameter (or meta-parameter) in some examples. Such combined parameter or meta-parameter can then be processed as described in the present disclosure.

For instance, the parameter can be determined based on a ratio of peak widths of a peak at different peak heights. In other examples, the one or more monitored parameters can be determined based on a ratio of peak width and a peak height of an MS measurement peak. In still other examples, the one or more monitored parameters can be determined based on a ratio of different retention times. In still other examples, the one or more monitored parameters can be determined based on a ratio of different peak width, peak area or peak height parameters.

Other (e.g., more complex) combined parameters than ratios can also be used in some examples.

The parameters described above can be derived from different measurements carried out by the analyzer.

In some examples, a combined parameter can be independent of an analyte concentration of the respective sample while one or more of the parameters being used to calculate the combined parameter are not independent of an analyte concentration of the respective sample. For instance, in some examples two parameters change in a similar manner when the analyte concentration changes. Then, a suitably combined meta-parameter can be independent of an analyte concentration of the respective sample (e.g., a ratio or difference of the two parameters).

In general, each of the parameters described above can be determined for an analyte of interest or for an internal standard.

For example, a monitored parameter can be a peak width or height parameter for an internal standard, or a background height at a measurement of the internal standard. Monitoring parameters of the internal standard (or another substance present in samples in a known quantity) can secure that the measured parameters are independent of an analyte concentration of an analyte of interest in the respective sample. Generally, internal standards are selected to exhibit this property.

It should be kept in mind, however, that not each of the parameters described above for each measurement qualifies as independent of an analyte concentration of the analyte of interest of the respective sample. For example, a peak height of an MS peak for the analyte might not have this property. In other examples it might have this property, if, e.g., related to the height of ubiquitous peaks. The term "ubiquitous peaks" refers to (common) background contamination ions encountered in LC-MS systems. Examples include but are not limited to polyethylene glycol, polypropylene glycol, phthalates, organic solvent clusters, solvent modifiers, fatty acids, metal ions, detergents like tritons, tweens, and siloxanes. Metal ions, in particular, form adducts with varying numbers of substrates to give characteristic ESI+/− ions.

In addition or alternatively, each of the parameters described above can be determined for a quantifier and a qualifier used in a respective MS measurement. For example, a monitored parameter can be a peak width or height parameter for a quantifier, or a background height at a measurement of the qualifier. These parameters can again be used for a qualifier of the analyte of interest or the internal standard, and a quantifier of the analyte of interest and the internal standard.

As discussed above, multiple parameters can be combined and processed further in some examples. However, in other examples (or in combination with combining parameters), the processing further and particularly the step of determining if the one or more monitored parameters show an expected behavior can include processing in parallel multiple of the parameters discussed above (e.g., using statistical techniques to analyze a trend or longitudinal development, or comparing parameters of different LC streams). In these examples, a response can be triggered if one, two, or more than two of the monitored parameters does not show an expected behavior.

In some examples, the monitored parameters can be processed by using different numerical or machine learning techniques to determine if the monitored parameters show an expected behavior. For example, the analyzer can use model-based or model-free approaches to determine if the monitored parameters show an expected behavior.

In some examples, different parameters can be used to monitor different components of an LC stream. For instance, a peak width parameter, a peak shape parameter (e.g., an asymmetry or tailing of an MS peak), or a retention time can be used to monitor a behavior of an LC column of an LC stream.

Example Technique Including Comparing Single LC Stream

In the preceding section, techniques have been discussed in which (at least) two different LC streams have been compared to determine if the one or more monitored parameters show an expected behavior. In other examples, determining if the one or more monitored parameters show an expected behavior includes using one or more earlier measurements in the same LC stream as the respective monitored one or more parameters used in the determining step.

Figure 3:
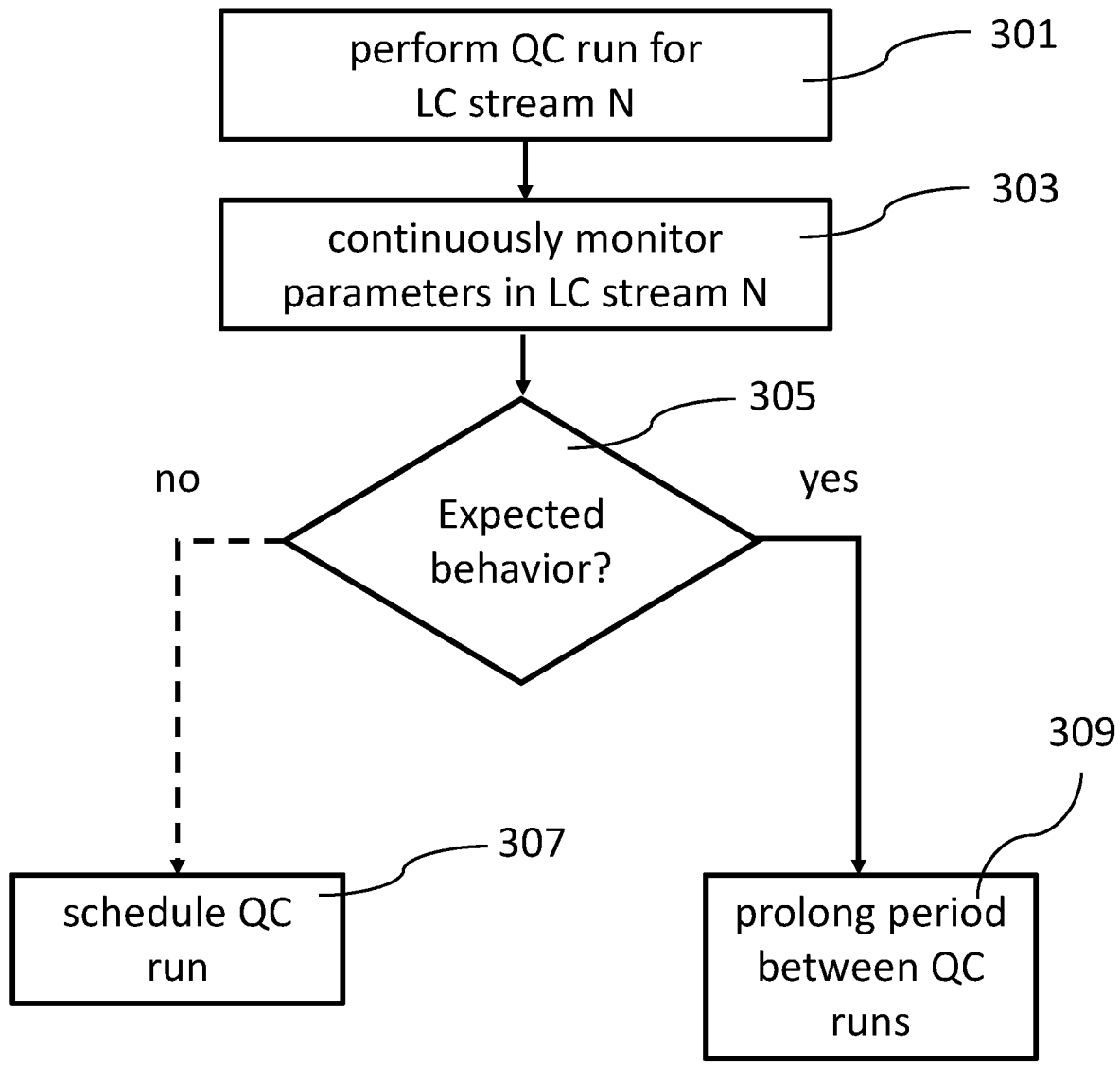
FIG. 3 is a flow diagram illustrating an example monitoring technique including a single LC stream according to an embodiment of the present disclosure.

FIG. 3 is a flow diagram illustrating an example of monitoring technique including a single LC stream according to the present disclosure.

The method comprises performing a quality control run 301 for a particular LC stream ("LC stream N").

Then, a target for parameters (e.g., as described above) can determined based on one or more measurements in the same LC stream in or directly after a quality control run in the respective LC stream, optionally less than 1 hour after a quality control run in the respective LC stream (e.g., less than 15 minutes after a quality control run in the respective LC stream).

The method continues with continuously monitoring 303 one or more parameters independent of an analyte concentration of an analyte of interest of the respective sample.

As described above, it can be determined 305 if the monitored one or more parameters exhibit an expected behavior (e.g., not deviating from the target defined before).

Depending on the outcome of the determining step, a response can be triggered 307, 309.

In the example of FIG. 3, the response consists in prolonging 309 a period of time between two consecutive quality control runs in a particular LC stream if the determining step yields that the one or more monitored parameters show the expected behavior (e.g., do not deviate from the target). For instance, quality control runs can be performed less frequently than daily for each stream per assay and concentration level used in quality control procedures.

In addition, the response consists in scheduling a QC run 307 if the determining step yields that the one or more monitored parameters do not show the expected behavior (e.g., deviate from the target).

The technique in FIG. 3 uses an earlier measurement in the same LC stream as a reference point for a later measurement (instead of a measurement in a different LC stream as discussed in connection with FIG. 2). Here, the rationale is that a measurement in or directly after a quality control run in the respective LC stream can be used as reference for later measurements.

The technique of FIG. 3 involving using an earlier measurement in the same LC stream as a reference point for a later measurement in this very stream can be employed for multiple (e.g., all) LC streams of any analyzer in parallel.

However, regardless of these differences the techniques described in connection with cross-checking two or more LC streams can also be applied in the case of checking later measurements of a single LC stream against earlier measurements in the same LC stream (unless the particular technique is specific to cross-checking two or more LC streams).

In some examples, the techniques of checking monitored parameters in the same LC stream can be combined with cross-checking parameters across two or more LC streams.

The techniques of the present disclosure can be carried out for each assay (e.g., each analyte of interest) for multiple assays of an analyzer.

Analyzer Details

The present disclosure also relates to an analyzer combining a liquid chromatography device (LC) and a mass spectrometer (MS), the analyzer including at least two liquid chromatography (LC) streams connected to a single mass spectrometer (MS), the analyzer being configured to carry out the steps of the techniques of the present disclosure.

For example, the one or more LC streams may include one or more high-performance (HP) LC streams, one or more Ultra High Performance (UHP) LC streams, one or more micro LC streams, or a combination of HP LC streams, UHP LC streams or micro LC streams.

In some examples, the analyzer includes three or more LC streams, optionally three LC streams.

Figure 4:
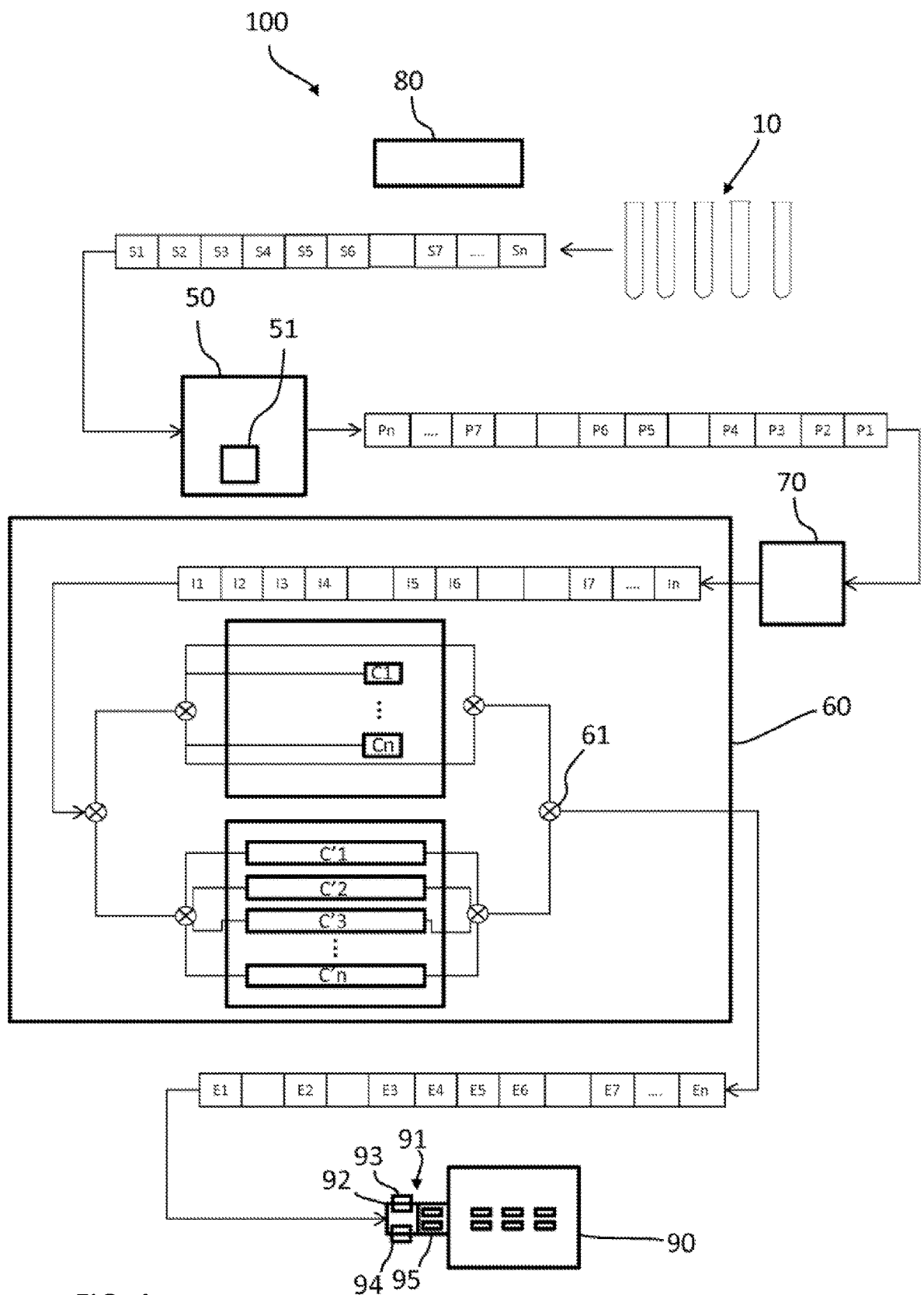
FIG. 4 illustrates an example analyzer combining a liquid chromatography (LC) device and a mass spectrometer (MS) according to an embodiment of the present disclosure.

An example analyzer system including a mass spectrometer and multiple LC streams according to the present disclosure will subsequently be discussed in connection with FIG. 4. The different modules are shown in FIG. 4 as part of one analyzer 100. However, the analyzers of the present disclosure can also include only a sub-set of the different modules depicted in FIG. 4.

The analyzer 100 comprises a sample preparation station 50 for the automated pre-treatment and preparation of samples 10 comprising analytes of interest. The sample preparation station 50 can comprise a magnetic bead handling unit 51 for treating samples with magnetic beads carrying analyte and/or matrix selective groups.

In particular, the magnetic bead handling unit can include at least one magnetic or electromagnetic workstation for holding at least one reaction container and for manipulating magnetic beads added to a sample or samples contained therein. The magnetic bead handling unit 51 may further comprise a mixing mechanism for mixing fluids and/or resuspending the magnetic beads in the reaction container(s), e.g., by shaking or agitating the reaction container(s), e.g., by an eccentric rotation mechanism.

Alternatively, the bead handling unit 51 may be a flow-through system where the magnetic beads are captured in a stream or capillary flow-through device. According to this example, capturing, washing and releasing of analytes can be done by repeatedly magnetically capturing and releasing beads in a flow-through stream.

The term "bead" does not necessarily refer to a spherical shape but to a particle having an average size in the nanometer or micrometer range and having any possible shape. The beads can be supra- or paramagnetic beads, in particular beads comprising an $Fe^{3+}$ core.

Non-magnetic beads may also be used. In that case capturing and releasing may be based on filtration. The sample preparation station 50 may further comprise one or more pipetting device or fluid transport device for adding/removing fluids, such as samples, reagents, wash fluids, suspension fluids, into/from the reaction container(s).

The sample preparation station may further comprise a reaction container transporting mechanism (not shown in FIG. 4).

In alternative or in addition to magnetic bead handling, other enrichment techniques may be used, e.g., protein precipitation followed by centrifugation, cartridge based solid phase extraction, pipette tip based solid phase extraction, liquid extraction, affinity-based extraction (immunosorption, molecular imprints, aptamers, etc.).

The analyzer 100 further comprises a liquid chromatography (LC) device 60 comprising a plurality of LC streams C1-n, C'1-n.

The liquid chromatography (LC) device 60 can be an analytical apparatus or module or a unit in an analytical apparatus designed to subject the prepared samples to chromatographic separation in order for example to separate analytes of interest from matrix components, e.g., remaining matrix components or other potentially interfering substances after sample preparation that may still interfere with a subsequent detection, e.g., a mass spectrometry detection, and/or in order to separate analytes of interest from each other in order to enable their individual detection. In some examples, the LC device 60 can be an intermediate analytical apparatus or module or a unit in an analytical apparatus designed to prepare a sample for mass spectrometry and/or to transfer the prepared sample to a mass spectrometer.

According to the present disclosure, the LC device 60 includes multiple LC streams arranged in parallel and connected to a single MS device.

According to certain examples of the present disclosure the LC device 60 comprises at least one faster LC stream with a shorter cycle time and at least one slower LC stream with a longer cycle time. However, the LC device 60 may alternatively comprise at least two faster LC streams without slower LC streams or at least two slower LC streams without faster LC streams. A "cycle time" is the time that it takes from a sample input (injection) into an LC stream until the same LC stream is ready for another sample input. In other words, a cycle time is the minimum time elapsing between two consecutive sample inputs in the same LC stream under pre-determined conditions and can be measured in seconds. The cycle time includes injection time, separation time until elution of the last analyte of interest, and re-equilibration time in order to prepare the column for a new injection.

The terms "faster" and "slower" with reference to an LC stream are only relative terms used to compare different LC stream between them in the same LC device 60. In particular, the terms are related to the duration of the cycle time and not necessarily to the resolution capabilities of the LC streams.

The LC device 60 typically further comprises also a sufficient number of pumps, e.g., binary pumps in case of conditions requiring the use of elution gradients, and several switching valves.

In addition, as the LC device 60 includes a plurality of LC streams, it is advantageous that LC eluates from different LC streams are outputted in a staggered manner and not simultaneously so that LC eluate outputs can be detected sequentially, e.g., by a single common detector, and better distinguished from each other following a multiplexed approach.

The term "LC eluate" is herein used to indicate a fraction of the eluate that comprises at least one analyte of interest.

In routine practice, depending on the number and type of incoming samples and respective analysis orders, one LC stream rather than another, e.g., a slower LC stream rather than a faster LC stream or vice versa, a type of column in an LC stream rather than another type of column in another LC stream, could be required. It is thus possible that use of some LC stream is more frequent than use of other LC streams.

Different degrees of flexibility are possible based also on the number and type of LC streams, e.g., on the number and type of the faster and slower LC streams respectively.

In the example of FIG. 4 the C1-n are faster LC streams with a shorter cycle time and C'1-n are slower LC streams (e.g., with a longer cycle time) and where n can be any integer number equal or greater than 1.

Thus, the LC device 60 may comprise at least one faster LC stream CI with a shorter cycle time and at least one slower LC stream C1 with a longer cycle time. However, the LC device 60 may comprise a plurality of only faster LC streams C1-n, where n is at least 2, or a plurality of only slower LC streams C'1-n, where n is at least 2. In this example, the LC device 60 comprises two faster LC streams C1-n, where n=2, with a shorter cycle time and four slower LC steams C'1-n, where n=4, with a longer cycle time, where the relative length of the respective shorter and longer cycle times is schematically indicated (not to scale) by the different length of the bars representing the LC streams C1-n and C'1-n respectively in FIG. 4. The shorter cycle time can be for example between 10 seconds and 1 minute (for example 36 seconds) and this time can define a reference period. The longer cycle time can be n times the reference period.

Also, the elution time windows of the slower LC streams for the elution of analytes of interest can be set to be as long as or shorter than the reference period by choosing the LC columns and setting the chromatographic conditions accordingly.

The faster LC streams C1-n can be rapid trap and elute online liquid chromatography streams, one of which comprising for example a reversed phase column and the other comprising for example a HILIC column. The slower LC streams C'1-n can be ultra-high-performance liquid chromatography (UHPLC) streams comprising for example two reversed-phase columns and two HILIC columns respectively.

The slower LC streams may be the same or different between them, e.g., one comprising a HILIC column and one comprising a reversed phase (RP) or a pentafluorophenyl (PFP) column, where the conditions are selected such that the cycle time can be the same for different columns respectively. The faster LC stream(s) may be the same or different between them respectively, e.g., one comprising a HILIC column and one comprising a reversed phase (RP) or a pentafluorophenyl (PFP) column, where the conditions are selected such that the cycle time can be the same for different columns respectively.

According to an example, the at least one faster LC stream is a capillary flow injection analysis (FIA) stream or a rapid trap and elute online liquid chromatography stream and the at least one slower LC stream is an ultra-high-performance liquid chromatography (UHPLC) stream. In particular, depending on the analytes of interest each prepared sample may be inputted into a faster LC stream or into a slower LC stream. For example, if a sample requires only analyte purification and concentration, since sufficient separation can be obtained for example in a subsequent mass spectrometry analysis and/or other separation technique, the sample is inputted into a faster LC stream, e.g., a FIA or rapid trap and elute online liquid chromatography stream. In such a case, a stationary phase is chosen that retains the analytes of interest whereas any salts, buffer, detergents and other matrix components are unretained and washed away. This process is typically followed by elution of the analytes, e.g., in back flush mode, with a different mobile phase or a solvent gradient. Depending on the analytes, separation of some analytes may be expected in some cases. On the other hand, in case of analytes having identical masses (isobaric) and/or overlapping daughter ion spectra in multiple reaction monitoring (MRM), when it comes to mass spectrometry, a more extensive chromatographic separation might be typical. In that case the sample is imputed into a slower LC stream, e.g., a UHPLC stream.

The analyzer 100 further comprises a sample preparation/LC interface 70 for inputting prepared samples into any one of the LC streams C1-n, C'1-n.

The sample preparation/LC interface can be a module between the sample preparation station and the LC device 60 or a unit integrated in the sample preparation station or in the LC device 60 or sharing components between the sample preparation station and the LC device 60.

The sample preparation/LC interface may comprise a container handling unit or a prepared sample receiving unit with any one or more of a holding function, a gripping function, a transfer function. In some examples, the prepared sample receiving unit is a reusable recess into which prepared samples are received one after another according to the prepared sample output sequence just before being inputted into an LC stream, where the recess may be washed between consecutive samples.

The sample preparation/LC interface can include a liquid handling unit to input prepared samples to any of the LC streams. The liquid handling unit may comprise any one or more of a pipetting device, a pump, an autosampler, a flow-injection device, one or more switching valves, in particular at least one switching valve to switch between LC streams. In particular, the container handling unit and the liquid handling unit can be designed to enable random access of any available LC stream to any prepared sample.

A combination of both the analyte enrichment technique and the matrix depletion technique, at least for some samples, may have the advantage to extend the number of different analytes that can be extracted from a sample, to avoid unnecessary dilutions, and to be more effective at removing the matrix.

The analyzer 100 further comprises a controller 80 configured to control the analyzer.

The controller 80 can be configured to carry out the steps of the monitoring techniques of the present disclosure. The controller 80 can be a programmable logic controller running a computer-readable program provided with instructions to perform operations. The controller 80 can be located in a local environment of the analyzer 100, or can be a remote controller located at a remote location (or a mixture of the two).

In particular, the controller can perform the steps of continuously monitoring parameters in each of at least two LC streams, determining if the monitored parameters show an expected behavior and triggering a response upon detection that monitored parameters deviate from expected behavior as described herein.

In addition, the controller can be programmed to assign samples 10 to pre-defined sample preparation workflows each comprising a pre-defined sequence of sample preparation steps and requiring a pre-defined time for completion depending on the analytes of interest.

Moreover, the controller 80 can be configured to perform operations in accordance with an operation plan and in particular associated with sample preparation and LC stream input.

In particular, the controller 80 may cooperate with a scheduler in order to take into account received analysis orders and a number of scheduled process operations associated with the execution of the analysis orders in order to decide when and which sample has to be prepared and for each sample when and which preparation step has to be executed. As different types of samples and/or different analytes of interest contained in the same or different types of samples may require different preparation conditions, e.g., different reagents, or different number of reagents, different volumes, different incubation times, different washing conditions, etc. . . . preparation of different samples may require different sample preparation workflows. The controller 80 is thus programmed to assign samples to pre-defined sample preparation workflows each comprising a pre-defined sequence of sample preparation steps, including, e.g., different steps and/or a different number of steps, and requiring a pre-defined time for completion, e.g., from a few minutes to several minutes.

The controller 80 thus may schedule sample preparation to occur in parallel or in a staggered manner for different samples. By doing so in a logical manner, the controller 80 schedules the use of functional resources of the sample preparation station in order to increase efficiency while avoiding conflicts and maximizes throughput by preparing samples at a pace at which prepared samples can be inputted into the LC device 60. This means that rather than preparing a batch of samples in advance, which of course is also possible, the controller can instruct the sample preparation station to prepare samples as needed or as can be taken by the LC device 60, in particular by the individual LC streams, while taking into account incoming orders, e.g., priority orders, time of preparation, required use of functional resources, and especially availability of the LC stream for which that sample is intended by the time sample preparation is completed.

In the example of FIG. 4, the controller 80 is further programmed to assign (reserve in advance) an LC stream C1-n, C'1-n for each prepared sample depending on the analytes of interest and to plan an LC stream input sequence I1-n for inputting the prepared samples that allows analytes of interest from different LC streams C1-n, C'1-n to elute in a non-overlapping LC eluate output sequence E1-n based on expected elution times. The controller 80 is further programmed to set and initiate a sample preparation start sequence S1-n that generates a prepared sample output sequence P1-n that matches the LC stream input sequence I1-n.

In FIG. 4 each sample of the sample preparation start sequence S1-n, each prepared sample of the prepared sample output sequence P1-n and LC stream input sequence I1-n, each LC eluate of the LC eluate output sequence E1-n is indicated in a segment of a sequence comprising non-overlapping adjacent segments, each segment representing schematically one reference period. Each sequence is thus a sequence of reference periods or time units, the length of which can be fixed and remains constant across the different sequences. In particular the shorter cycle time of the faster LC stream can be taken as reference period (for example 36 seconds).

Preparation of new samples in the sample preparation start sequence S1-n can be started with a frequency of one sample per reference period, i.e., every 36 seconds in this example, or at intervals separated by one or more reference periods, indicated by empty segments in the sequence, in which no sample preparation is started. Also, preparation of samples in the prepared sample output sequence P1-n can be completed with a frequency of one prepared sample per reference period or at intervals separated by one or more reference periods, indicated by empty segments in the sequence, in which no sample preparation is completed. Also, the prepared samples can be inputted in the respective assigned LC streams according to the LC stream input sequence I1-n with a frequency of one LC stream input per reference period or at intervals separated by one or more reference periods, indicated by empty segments in the sequence, in which no LC stream input takes place.

Also, the LC eluates in the LC eluate output sequence E1-n can be outputted with a frequency of one LC eluate per reference period or at intervals separated by one or more reference periods, indicated by empty segments in the sequence, in which no LC eluate is outputted.

The clinical diagnostic system 100 further comprises a mass spectrometer (MS) 90 and an LC/MS interface 91 for connecting the LC device 60 to the mass spectrometer 90.

According to an example, the LC/MS interface comprises an ionization source, for the generation of charged analyte molecules (molecular ions) and transfer of the charged analyte molecules into the gas phase. According to certain examples, the ionization source is an electro-spray-ionization (ESI) source or a heated-electrospray-ionization (HESI) source or an atmospheric-pressure-chemical-ionization (APCI) source or an atmospheric-pressure-photo-ionization (APPI) or an atmospheric-pressure-laser-ionization (APLI) source. The LC/MS interface may comprise however a double ionization source, e.g., both an ESI and an APCI source or a modular exchangeable ionization source. Such ionization sources are known in the art and not further elucidated here.

In order to optimize ionization conditions, it may be typical to adjust solvent composition by adding a make-up flow directly before the ion source to adjust pH, salts, buffers or organic content.

In one example, all LC streams are alternately connectable to the ionization source and the controller controls a valve switching according to the LC eluate output sequence.

In one example, the mass spectrometer is a fast scanning mass spectrometer. For instance, the mass spectrometer can be a tandem mass spectrometer capable of selecting parent molecular ions, generating fragments by collision induced fragmentation and separating the fragments or daughter ions according to their mass to charge (m/z) ratio. The mass spectrometer can be a triple quadrupole mass spectrometer, as known in the art.

According to an example, the LC/MS interface further comprises an ion mobility module between the ionization source and the mass spectrometer. According to an example, the ion mobility module is a high-field asymmetric waveform ion mobility spectrometry (FAIMS) module, as also known in the art, and that can achieve separation of molecular ions in the gas phase, including isobaric ions, in milliseconds. An ion mobility gas-phase separation before mass spectrometry could compensate for insufficient chromatographic separation, e.g., of isobaric interferences, especially for LC eluates from the at least one faster LC stream. Furthermore, ion mobility interfaces for mass spectrometers can reduce the overall background signal by preventing background and other nonspecific ions to enter the mass spectrometer. According to an example, the controller is further programmed to set an ionization source input sequence. The term "ionization source input sequence" refers to the order in which LC eluates are inputted into the ionization source. Typically, the ionization source input sequence corresponds to the LC eluate output sequence. However, by using for example bypass streams or streams of different length or changing the flow velocity the ionization source input sequence may be also changed. This allows the controller to have even more flexibility when planning the LC stream input sequence.

In some examples, LC eluates in the LC eluate output sequence can be inputted into the ionization source with a frequency of one LC eluate per reference period or at intervals separated by one or more reference periods. This means that there may be empty reference periods without an LC eluate being inputted into the ionization source, in the same time line consisting of a sequence of reference periods, among reference periods in which there is an ionization source input. The controller 80 can be programmed to make sure that only one LC eluate per reference period is inputted into the ionization source by taking into account the LC stream input sequence and the LC eluate output sequence and by controlling valve switching accordingly.

In the example of FIG. 4, the LC/MS interface 91 comprises an ionization source 92 and an ion mobility module 95 between the ionization source 92 and the mass spectrometer 95. The ion mobility module 95 is a high-field asymmetric waveform ion mobility spectrometry (FAIMS) module. The mass spectrometer 90 is a tandem mass spectrometer and in particular a triple quadrupole mass spectrometer, capable of multiple reaction monitoring (MRM).

The LC streams C1-n, C'1-n are alternately connectable to the LC/MS interface 91 and the controller 80 controls a valve switching 61 according to the LC eluate output sequence E1-n for inputting one LC eluate at a time into the ionization source 92. In particular, the LC eluates in the LC eluate output sequence E1-n are inputted into the ionization source 92 with a frequency of one LC eluate per reference period or at intervals separated by one or more reference periods according to the LC eluate output sequence E1-n. The ionization source 92 is a double ionization source, including an ESI source 93 and an APCI source 94, where depending on the LC eluate in the LC eluate output sequence E1-n and on the analyte(s) of interest contained therein the controller 80 may select one of the two ionization sources 93, 94 that is most appropriate. When setting the sample preparation start sequence S1-n, the controller 80 may group together (place adjacent to each other in the sequence) samples also according to the ionization source 93, 94 so that frequent switch between ionization sources 93, 94 is prevented. Ionization source switching may be planned during one or more empty reference periods for example.

Computer Implementation Aspects

The present disclosure also relates to computer-readable media that include instructions which, when executed by a controller of an analyzer, prompts the analyzer to perform the steps of the monitoring techniques of the present disclosure.

These computer-readable media include, e.g., hard discs or flash memories but also non-tangible media. For example, the present disclosure relates to software or software modules which is downloaded to a controller of an analyzer and includes instructions which, when executed by a controller of an analyzer, prompts the analyzer to perform the steps of the monitoring techniques of the present disclosure.

In addition, the present disclosure also relates to control signals for an analyzer which control the analyzer to perform the monitoring techniques of the present disclosure.

Further Aspects

A number of aspects of the monitoring techniques of the present disclosure have been discussed in the preceding sections. In addition, the monitoring the present disclosure can also be carried out according to the following aspects:

Aspect 1: A method for monitoring an analyzer including a liquid chromatography device (LC) having at least two liquid chromatography (LC) streams, the method comprising: continuously monitoring one or more parameters in measurement data of samples in each of the at least two LC streams, the one or more parameters being independent of an analyte concentration of the respective sample; determining if the one or more monitored parameters show an expected behavior; and triggering a response upon detection that the one or more monitored parameters deviate from the expected behavior.

Aspect 2: The method of aspect 1, wherein the expected behavior for a second LC stream of the at least two LC streams is determined based on the monitored one or more parameters in a first LC stream of the at least two LC streams.

Aspect 3: The method of aspect 1 or aspect 2, wherein a deviation of the one or more monitored parameters in a second LC stream of the at least two LC streams is determined based on evaluating the one or more monitored parameters in at least the second LC stream and a first LC stream of the at least two LC streams.

Aspect 4: The method of any one of aspects 1 to 3, wherein determining if the one or more monitored parameters show an expected behavior includes determining that the one or more parameters fall within a target range or target ranges for the respective monitored one or more parameters or a target range for a composite value calculated from two or more monitored parameters.

Aspect 5: The method of aspect 4, wherein the target range or target ranges are determined based on one or more measurements in a first LC stream different from a second LC stream whose monitored one or more parameters are used in the determining step.

Aspect 6: The method of aspect 2, aspect 3 or aspect 4, wherein the first LC stream is a LC stream which has undergone a quality control run more recently than the second LC stream.

Aspect 7: The method of aspect 2, aspect 3 or aspect 4, wherein the first LC stream is a LC stream in which one or more components, optionally an LC column, have been replaced or have undergone a maintenance operation more recently than the respective one or more components of the second LC stream.

Aspect 8: The method of any one of aspects 2 to 7, further comprising: assuming that the second LC stream is operating properly when the monitored one or more parameters do not deviate from the target range or target ranges.

Aspect 9: The method of any one of aspects 2 to 8, wherein the first and second LC streams include one or more of different LC columns, different pumps or different valves.

Aspect 10: The method of any one of the preceding aspects, further comprising prolonging a period of time between two consecutive quality control runs in a particular LC stream if the determining step yields that the one or more monitored parameters do show the expected behavior.

Aspect 11: The method of any one of aspects 1 to 10, wherein the response includes scheduling or triggering a quality control run on the respective LC stream whose one or more monitored parameters deviate from the expected behavior.

Aspect 12: The method of any one of aspects 2 to 11, wherein the response includes scheduling or triggering a quality control run in the second LC stream of the at least two LC streams based on the determining that the one or more monitored parameters in the second LC stream deviate from the expected behavior determined based on the monitored one or more parameters in the first LC stream.

Aspect 13: The method of any one of aspects 1 to 12, wherein the response includes scheduling or triggering a maintenance operation on the respective LC stream.

Aspect 14: The method of any one of aspects 2 to 13, wherein the response includes scheduling or triggering a maintenance operation of the second LC stream of the at least two LC streams based on the determining that the one or more monitored parameters in the second LC stream deviate from the expected behavior determined based on the monitored one or more parameters in the first LC stream.

Aspect 15: The method of any one of the preceding aspects 1 to 14, wherein the response includes providing an error message.

Aspect 16: The method of any one of aspects 1 to 15, wherein the continuously monitoring happens on samples with unknown composition.

Aspect 17: The method of aspect 16, wherein the samples with unknown composition include patient samples analyzed by the analyzer.

Aspect 18: The method of any of the preceding aspects 1 to 17, wherein the continuously monitoring happens on a majority of samples, optionally each sample processed by the analyzer.

Aspect 19: The method of aspect 4, wherein the target range or the target ranges are dynamically updated during operation of the analyzer.

Aspect 20: The method of any one of the preceding aspects 1 to 19, wherein the expected behavior is defined based on one or more measurements taken from previous samples processed in the analyzer.

Aspect 21: The method of any one of the preceding aspects 1 to 20, wherein the expected behavior is a particular correlation between the one or more monitored parameters and additional monitored parameters of the analyzer.

Aspect 22: The method of any one of the preceding aspects 1 to 21, wherein the expected behavior is determined based on a trend in the one or more monitored parameters.

Aspect 23: The method of any one of aspects 1 to 22, wherein deviating from the expected behavior includes deviating by more than a threshold distance from one or more previous values of the one or more monitored parameters.

Aspect 24: The method of any one of aspects 1 to 23, wherein the expected behavior is determined based on one or more earlier measurements in the same LC stream as the respective monitored one or more parameters used in the determining step.

Aspect 25: The method of aspect 24, wherein the expected behavior is determined based on one or more measurements in the same LC stream in or directly after a quality control run in the respective LC stream, optionally less than 1 hour after a quality control run in the respective LC stream.

Aspect 26: The method of any one of aspects 1 to 25, wherein the one or more monitored parameters are determined based on one or more of a peak width parameter, a peak shape parameter, a peak height parameter or a peak area parameter of a measurement peak.

Aspect 27: The method of any one of aspects 1 to 26, wherein the one or more monitored parameters are determined based on at least one of a retention time, a peak start time parameter or a peak end time parameter.

Aspect 28: The method of any one of aspects 1 to 27, wherein the one or more monitored parameters are determined based a ratio of peak widths of an MS peak at different peak heights.

Aspect 29: The method of any one of aspects 1 to 28, wherein the one or more monitored parameters are determined based on a ratio of peak width and a peak height of an MS measurement peak.

Aspect 30: The method of any one of aspects 1 to 29, wherein the one or more monitored parameters are determined based on one or more of a measurement background parameter and a measurement noise parameter.

Aspect 31: The method of any one of aspects 1 to 30, wherein the one or more monitored parameters are determined based on a slope of a baseline.

Aspect 32: The method of any one of aspects 1 to 31, wherein the one or more monitored parameters are determined based on a quantifier or a qualifier peak of the analyte of interest in the sample or an internal standard for the analyte of interest.

Aspect 33: The method of any one of aspects 1 to 32, wherein the one or more LC streams include one or more high-performance (HP) LC streams, one or more Ultra High Performance (UHP) LC streams, one or more micro LC streams, or a combination of HP LC streams, UHP LC streams or micro LC streams.

Aspect 34: The method of any one of the preceding aspects 1 to 33, wherein the LC device includes three or more LC streams, optionally three LC streams.

Aspect 35: The method of any one of aspects 1 to 34, wherein the LC device is coupled to a mass spectrometer (MS).

Aspect 36: The method of any one of the preceding aspects 1 to 35, wherein quality control runs are performed less then daily for each LC stream per assay and concentration level used in quality control procedures.

Aspect 37: The method of aspect 1 to 36, wherein determining if the one or more monitored parameters show an expected behavior includes comparing the monitored one or more parameters in different ones of the two or more LC streams.

Aspect 38: The method of any one of the preceding aspects, comprising determining if the one or more monitored parameters show an expected behavior for each of two or more quality control concentration levels for the two or more LC streams.

Aspect 39: The method of aspect 38, wherein, for each quality control concentration level, the expected behavior for a second LC stream of the at least two LC streams is determined based on the monitored one or more parameters in another LC stream of the at least two LC streams.

Aspect 40: The method of any one of the preceding aspects, comprising determining if the one or more monitored parameters show an expected behavior for each of two or more assays or analytes of interest for the two or more LC streams.

Aspect 41: The method of aspect 40, wherein, for each assay or analytes of interest, the expected behavior for a second LC stream of the at least two LC streams is determined based on the monitored one or more parameters in another LC stream of the at least two LC streams.

Aspect 42: An analyzer combining a liquid chromatography device (LC) and a mass spectrometer (MS), the analyzer including at least two liquid chromatography (LC) streams connected to a single mass spectrometer (MS), the analyzer being configured to carry out the steps of the methods any one of aspects 1 to 41.

Aspect 43: A computer readable medium including instructions stored thereon, which when executed by a processor of an analyzer prompt the analyzer to carry out the steps of the methods any one of aspects 1 to 41.

What is claimed is:

1. A method for monitoring an analyzer including a liquid chromatography device (LC) having at least two liquid chromatography (LC) streams, the method comprising:
   continuously monitoring one or more parameters in measurement data of samples in each of the at least two LC streams;
   determining if the one or more monitored parameters show an expected behavior; and
   triggering a response upon detection that the one or more monitored parameters deviate from the expected behavior, wherein the expected behavior for a second LC stream of the at least two LC streams is determined based on the monitored one or more parameters in a first LC stream of the at least two LC streams, wherein the one or more parameters being independent of an analyte concentration of the respective sample.

2. The method of claim 1, wherein determining if the one or more monitored parameters show an expected behavior includes determining that the one or more parameters fall within a target range or target ranges for the respective monitored one or more parameters or a target range for a composite value calculated from two or more monitored parameters.

3. The method of claim 2, wherein the target range or target ranges are determined based on one or more measurements in a first LC stream different from a second LC stream whose monitored one or more parameters are used in the determining step.

4. The method of claim 1, wherein the first LC stream is a LC stream which has undergone a quality control run more recently than the second LC stream.

5. The method of claim 1, wherein the first LC stream is a LC stream in which one or more components have been replaced or have undergone a maintenance operation more recently than the respective one or more components of the second LC stream.

6. The method of claim 5, wherein the one or more components is an LC column.

7. The method of claim 1, further comprising assuming that the second LC stream is operating properly when the monitored one or more parameters do not deviate from the target range or target ranges.

8. The method of claim 1, further comprising prolonging a period of time between two consecutive quality control runs in a particular LC stream if the determining step yields that the one or more monitored parameters do show the expected behavior.

9. The method of claim 1, wherein the response includes scheduling or triggering a quality control run on the respective LC stream whose one or more monitored parameters deviate from the expected behavior.

10. The method of claim 1, wherein the response includes scheduling or triggering a maintenance operation on the respective LC stream.

11. The method of claim 1, wherein the continuously monitoring happens on samples with unknown composition.

12. The method of claim 11, wherein the samples with unknown composition include patient samples analyzed by the analyzer.

13. The method of claim 1, wherein the expected behavior is determined based on one or more earlier measurements in the same LC stream as the respective monitored one or more parameters used in the determining step.

14. The method of claim 1, wherein the one or more monitored parameters are determined based on one or more of a peak width parameter, a peak shape parameter, or a retention time.

15. The method of claim 14, wherein the peak shape parameter is an asymmetry or tailing of an MS peak.

16. An analyzer combining a liquid chromatography device (LC) and a mass spectrometer (MS), the analyzer including at least two liquid chromatography (LC) streams connected to a single mass spectrometer (MS), the analyzer being configured to carry out the steps of the method of claim 1.

17. A computer readable medium including instructions stored thereon, which when executed by a processor of an analyzer prompt the analyzer to carry out the steps of the method of claim 1.

* * * * *